United States Patent [19]

Smith

[11] 4,030,477

[45] June 21, 1977

[54] SOLAR COLLECTOR WITH CONICAL ELEMENTS

[76] Inventor: Philip D. Smith, 385 Camelback Road, Pleasant Hill, Calif. 94523

[22] Filed: Nov. 20, 1974

[21] Appl. No.: 525,583

[52] U.S. Cl. .............................. 126/270; 126/271
[51] Int. Cl.² ......................................... F24J 3/02
[58] Field of Search ........... 126/270, 271; 165/179; 138/138

[56] References Cited

UNITED STATES PATENTS

| 761,596 | 5/1904 | Moss .................................. 126/271 |
| 1,575,309 | 3/1926 | Anderson ........................... 126/271 |
| 3,102,532 | 9/1963 | Shoemaker ........................ 126/270 |
| 3,236,294 | 2/1966 | Thomason ......................... 126/271 |
| 3,875,925 | 4/1975 | Johnson ............................. 126/270 |
| 3,939,818 | 2/1976 | Hamilton et al. .................. 126/271 |

FOREIGN PATENTS OR APPLICATIONS

| 373,811 | 4/1923 | Germany ........................... 126/271 |
| 374,525 | 4/1923 | Germany ........................... 126/270 |

*Primary Examiner*—Kenneth W. Sprague
*Assistant Examiner*—James C. Yeung
*Attorney, Agent, or Firm*—Flehr, Hohbach, Test

[57] ABSTRACT

A device for collecting radiant energy is disclosed in which a conical surface is formed so as to convergently reflect rays toward an elongate energy absorbing structure which is disposed along a central focal axis. The conical surface has a relatively high reflectivity ($\rho$) coefficient while the outer surface of the energy absorbing structure has a relatively high absorbtivity ($\alpha$) coefficient and also is formed of a material having a relatively high thermal conductivity ($k$) for efficiently transferring thermal energy by convection to a heat exchange fluid. In one embodiment the energy absorbing structure comprises a hollow tube which is coiled in a helix about the focal axis, with a transparent cover enclosing the helix. In another embodiment the absorbing structure comprises an open ended hollow enclosure containing a porous filler having a relatively high thermal conductivity ($k$). Another embodiment provides an enclosure which contains a plurality of cells creating a relatively large surface area for more efficiently transferring thermal energy by convection to the fluid, and in a further embodiment such cells are filled with porous filler. In still another embodiment a plurality of the conical surfaces are mounted within a housing facing a transparent panel, with means being provided to direct a fluid such as a gas into the housing and in heat exchange relationship with the energy absorbing structure associated with each conical surface.

3 Claims, 7 Drawing Figures

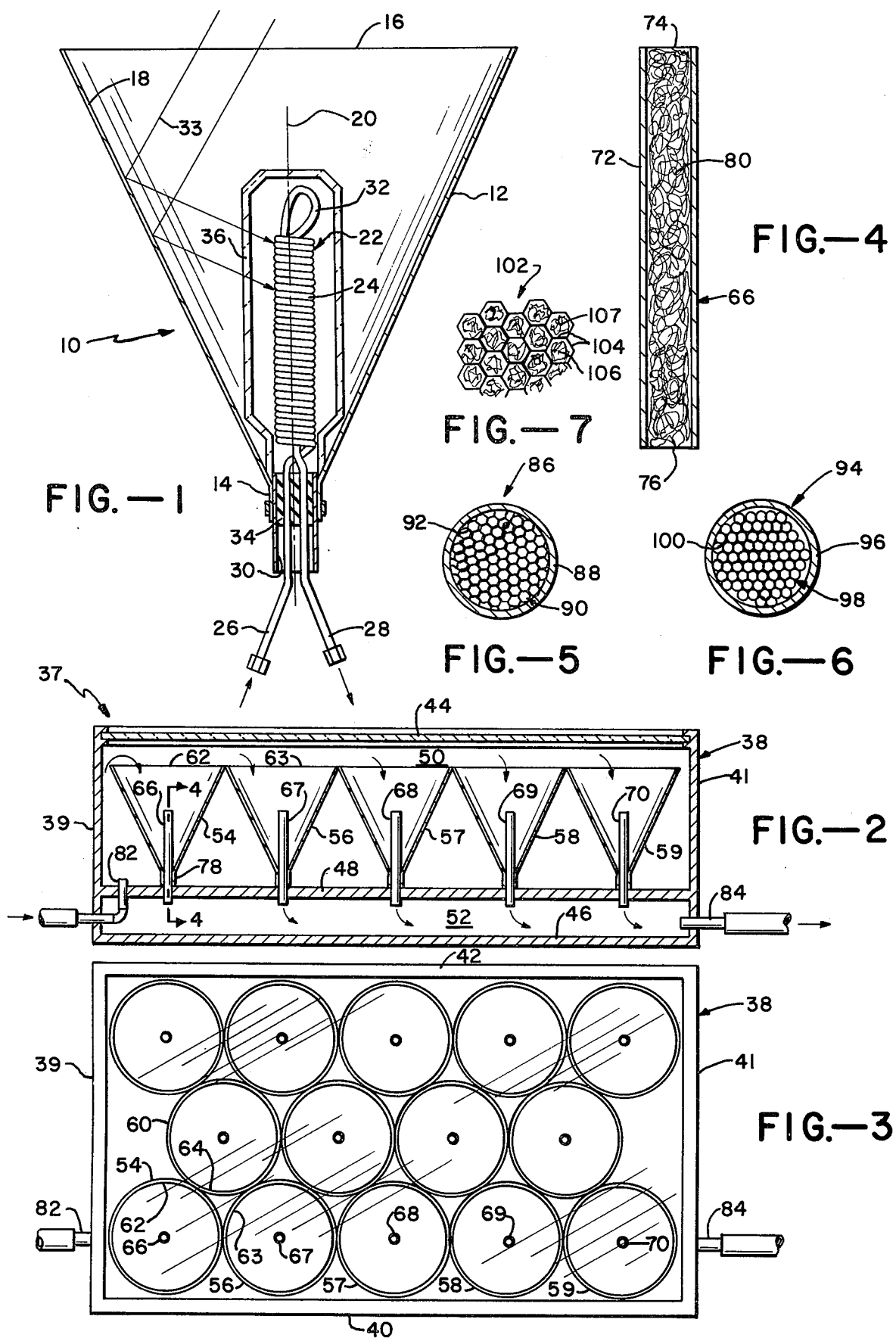

SOLAR COLLECTOR WITH CONICAL ELEMENTS

BACKGROUND OF THE INVENTION

This invention relates to radiant energy collecting devices, and in particular relates to solar energy collectors in which radiant energy is absorbed and transferred as thermal energy to a heat exchange fluid.

Various solar collector devices have heretofore been provided in the prior art for collecting and utilizing radiant energy received from the sun. Among these prior art devices are flat plate collectors in which a flat array of plates absorbs the sun's rays, with a fluid being passed in heat exchange relationship with the plates to collect and carry away thermal energy. However, such prior art devices have not achieved a high degree of efficiency in collecting the available solar energy. Temperatures of the outlet fluid have not been high, and furthermore for any given rate of energy production it has been necessary to build a collector structure having a total plate area of large dimensions with the result that costs are high in relation to the output energy rate while space utilization is low. In addition, heretofore it has been necessary to cover the entire frontal surface of flat plate collectors with a material having a good absorbtivity ($\alpha$) coefficient, and this is extremely costly where it is desired to utilize a material having a very high $\alpha$ coefficient, such as black nickel over bright nickel, for maximum efficiency. The development of a more efficient solar collector would assist in relieving the energy shortage, would make it feasible to employ currently unused spaces for collecting such energy, such as on the spaces on the walls of a building or other structure, and would be less costly from the standpoint of materials used in making the collector.

OBJECTS AND SUMMARY OF THE INVENTION

It is a general object of the invention to provide a new and improved solar energy collector which is more efficient in absorbing radiant energy and converting it into usable thermal energy.

Another object of the invention is to provide a solar energy collector of the type described which achieves high energy collection efficiency while at the same time is less costly to construct.

Another object is to provide a solar energy collector of the type described in which incident rays are reflected from a conical surface and concentrated for absorption on a central energy absorbing structure through which the heat exchange fluid passes.

Another object is to provide a solar energy collector of the type described in which an array of conical elements which efficiently collect radiant energy can be mounted on the sidewalls of a building or other structure with aesthetic appeal.

The foregoing and additional objects and features of the invention will become apparent from the following description in which the preferred embodiments have been set forth in detail in conjunction with the accompanying drawings.

BRIEF DESCRIPTION OF THE DRAWINGS

FIG. 1 is a cross-sectional view of one embodiment of a solar energy collector of the invention;

FIG. 2 is a cross-sectional view of another embodiment of a solar energy collector of the invention;

FIG. 3 is a top plan view of the solar energy collector of FIG. 2;

FIG. 4 is an axial section view to an enlarged scale taken along the line 4—4 of FIG. 2 through one of the energy absorbing structures;

FIG. 5 is a cross-sectional view through the energy absorbing structure of another embodiment of the invention;

FIG. 6 is a cross-sectional view through the energy absorbing structure of still another embodiment of the invention; and FIG. 7 is an enlarged fragmentary cross-sectional view through the energy absorbing structure of yet another embodiment of the invention.

DESCRIPTION OF THE PREFERRED EMBODIMENT

In the drawings FIG. 1 illustrates generally at 10 a solar collector constructed in accordance with the present invention. Collector 10 includes a conical shell or cone 12 which diverges outwardly from a closed apex end 14 toward a circular open collecting end 16. Suitable mounting means, not shown, is provided to support the solar collector at an orientation to receive radiant energy from the sun through collecting end 16. Preferably this orientation is at a sufficient vertical angle from the horizon so that the sun's rays will be directed into the cone throughout approximately 6 hours of daylight.

The inner surface 18 of the cone is formed with a relatively high reflectivity ($\rho$) coefficient. Suitable materials which could be employed for this purpose are silver ($\rho = 0.93$), zinc ($\rho = 0.60$), specular aluminum ($\rho = 0.83$) or polished aluminum ($\rho = 0.69$). The cone could either be integrally constructed of the reflective material, or a layer of such material could be deposited on the inner surface.

The included angle of cone 12 should be less than 90°, and preferably in the range of 40° to 60°. Included angles of greater than 90° are undesirable because incident rays which strike the cone from any appreciable angle from the perpendicular would be reflected back out of the cone. Included angles of less than about 40° are undesirable from cost considerations because of the increased number of cones which would be required for a given frontal area.

Incident rays are reflected from surface 18 so as to converge toward a central focal axis 20 extending longitudinally of the cone. An energy absorbing structure 22 is mounted within the cone along a substantial length of focal axis 20 so as to receive and absorb the concentrated reflected rays. In the embodiment of FIG. 1 structure 22 comprises a small diameter hollow tube 24 having inlet and outlet portions 26, 28 which extend upwardly through a circular opening 30 in the cone apex. Inlet portion 26 is coiled in a helical path about a diameter of focal axis 20 and connects through bight 32 with outlet portion 28 which extends in a straight path down through the center of the outer helix. The width of the helical portion of tube 24 is of a sufficient dimension which blocks and absorbs a relatively wide arc of reflected rays so as to collect rays which may be scattered, such as due to surface irregularities, when they are reflected from surface 18. The axial length of the helix is of a sufficient dimension so that a substantial amount of incident rays which strike the margin of surface 18 adjacent end 16, as illustrated by the ray 33, are reflected through an angle to strike the mid-portion of energy absorbing structure 22. This serves to concentrate the energy absorption at the lower portion of the helix.

The outer surface of energy absorbing structure 22 has a relatively high absorbtivity ($\alpha$) coefficient for converting the radiant energy into thermal energy, and has a relatively low emissivity ($\epsilon$) coefficient so as to minimize heat loss through re-radiation. Preferably a combination of an underlying layer of bright nickel together with an outer thin layer of black nickel, on the order of a few microns in thickness, is formed about the outer surface of the energy absorbing structure, and particularly about the outer surface of the helical portion of tube 24 which faces cone surface 18. This combination layer of black nickel over bright nickel provides an $\alpha$ coefficient of 0.96 and an $\epsilon$ coefficient of 0.06, with the result that a relatively high $\alpha/\epsilon$ ratio of 16.5 is achieved. The outer layer of black nickel is an effective absorber in the short or visable wavelengths and is a good conductor into the underlying layer, while the bright nickel layer does not emit energy in the infrared range so as to minimize losses through re-radiation. It is important to note that the total absorption surface area on tube 24 is small in relation to the frontal area of cone end 16. This is significant from a cost standpoint because the amount of black nickel/bright nickel material, which is relatively expensive, required is small in comparison to conventional flat plate collectors of equivalent frontal area size.

Tube 24 is constructed of a material having a relatively high thermal conductivity ($k$) to efficiently conduct thermal energy across to the inner surfaces of the tube for transfer by convection to a heat exchange fluid. Preferably the tube material is copper having a $k$ value of 0.91 cal/sec/cm$^2$/C°. Other materials which could be used for the tube are aluminum having a $k$ value of 0.5, or silver having a $k$ value of 1.0.

Energy absorbing structure 22 is mounted within opening 30 of the cone apex by means of an elastomeric circular plug 34 through which a pair of axial openings are formed for securely holding the inlet and outlet ends of tube 24. A transparent cover 36 of a suitable material such as glass or clear plastic is mounted at its base about the outer end of plug 34 and extends upwardly in close-spaced relationship about energy absorbing structure 22. Cover 36 functions to shield structure 22 from air currents so as to minimize heat losses by convection. A transparent panel could be mounted across the open end 16 of the cone, although it is preferred to leave this end open to permit air circulation for cooling the cone surface 18 and prevent its temperature from rising and acting as an energy radiator.

A suitable heat exchange fluid such as a liquid, e.g., cold water, is circulated by suitable means such as a pump, not shown, into inlet portion 26 of the tube and through the helix where it picks up thermal energy by convection. The heated fluid then flows back down through outlet portion 28 of the tube from which it is directed to the desired end use application, such as a hot water storage tank, or steam engine or turbine where collector 10 is used as a steam generator.

In the embodiment of FIG. 1 where the inlet portion of tube 24 is in the configuration of a single helix, the outlet portion 28 carries the higher temperature fluid and passes back within the helix so that radiation which is emitted from the outlet portion is reabsorbed by the inner surfaces of the helix. The energy absorbing structure could also comprise a double helix configuration in which both the inlet and outlet portions of the tube are mounted in helical paths which are interleaved and covered with an outer layer of a high $\alpha$ coefficient material. In this latter embodiment both of the inlet and outlet portions of the tube equally enter into the absorption of radiant energy and transfer of thermal energy to the heat exchange fluid.

The operation of collector 10 will be described for a specific size cone having a frontal area of three-fourth ft.$^2$. The cone is oriented at a fixed angle with respect to the sun so that it receives approximately 6 hours of solar radiation without the necessity of moving or tracking the collector with the sun. Cold water is pumped through inlet portion 26 of energy absorbing structure 22. The fluid flows upwardly through the helix and then reverses and returns downwardly within the helix for discharge through outlet portion 28. Radiant energy as illustrated by the typical ray 33 passes through the open collecting end 16 and is reflected by cone surface 18 so as to converge and be absorbed by the black nickel/bright nickel combination layer of tube 24. Thermal energy from the absorbed radiation is rapidly conducted through the walls of the tube where it is transferred by convection to the water in the helix. In one specific application where the average rate of radiant energy received from the sun was 300 BTU/hr./ft.$^2$, the energy input into the 3/4 ft.$^2$ cone was therefore 225 BTU/hr. The temperature rise of one gallon of water, initially at 60° F, recirculated through the collector was measured at 14° F. Thus the rate of energy absorption was 117 BTU/hr. so that the overall efficiency was $\eta = 52\%$.

FIGS. 2–4 illustrate another embodiment of the invention comprising a solar collector 37 having a relatively flat configuration. Collector 37 includes a generally rectangular housing 38 having sidewalls 39–42, a transparent front panel 44 of a suitable material such as glass or clear plastic supported about its periphery on the sidewalls, and an opaque back panel 46. A partition 48 is mounted transversely of the housing to separate the interior into an upper fluid inlet chamber 50 and a lower outlet chamber 52.

A plurality of conical shells or cones 54–60 are mounted within inlet chamber 50 with the apexes of each shell being supported above partition 48. The cones diverge outwardly from the apexes toward circular open ends 62–64 which are spaced below transparent panel 44 for receiving radiant energy which passes through this panel. As illustrated in FIG. 3 the edges of the cone open ends are in close juxtaposed relationship for space economy by minimizing the amount of unused frontal area between the cones.

The inner surfaces of each cone is formed with a relatively high reflectivity ($\rho$) coefficient for reflecting incident light rays in concentration toward the central focal axis which extends longitudinally of each cone. Preferably the inner surface of each cone is coated with a layer of high reflectivity material, such as silver, zinc, specular aluminum or polished aluminum, although the cones could be constructed entirely of such material.

The included angle of each cone 54–60 is less than 90°, and preferably is in the range of 40° to 60°, in a manner similar to that described for the embodiment of FIG. 1. The focal axis of each of the cones is oriented orthogonal to front panel 44 for use in applications where the incident rays are received through an arc which would generally extend on either side of a line perpendicular to the housing. It is an important aspect of the invention that the cones could be mounted within housing 38 so that their focal axes are oriented at any desired angle with respect to the front panel for maximizing the collection of radiant energy which may be received from oblique angles to the housing. In such a case the housing could be mounted on a side of the building, for example, where the sun's rays are received from a relatively high angle from the horizon, depending upon the particular latitude and season of the year.

An energy absorbing structure 66–70 is mounted within each of the respective cones. The energy absorbing structure 66 for cone 54 is typical and it will thus suffice to explain its construction in detail. As illustrated in FIG. 4 structure 66 comprises an elongate enclosure 72, preferably of circular cross-sectional shape, having an open front end 74 and an open rear end 76. The enclosure is formed of a suitable material having a relatively high thermal conductivity $(k)$, such as silver, aluminum or copper. The enclosure is mounted by suitable means such as by welding or brazing within a circular opening formed in cone apex 78. Enclosure extends coaxially along the cone's focal axis with the rear end projecting downwardly through an opening formed in partition 48 where it is in communication with outlet chamber 52. The front end 74 of the enclosure is in communication with the fluid in inlet chamber 50.

A porous filler 80 is packed within enclosure 72, and the filler is composed of a suitable strand-like material having a relatively high thermal conductivity $(k)$, such as steel, copper, or aluminum. Preferably the material comprises copper wool or steel wool material. The filler is packed so that it is in intimate thermal conducting contact with the inner surface of the enclosure. At the same time the filler is sufficiently loose so that it has a relatively low resistance to fluid flow through the filler interstices whereby heat which is conducted into the filler from the walls of the enclosure is efficiently transferred by convection to a heat exchange fluid passing through the enclosure. This embodiment of the invention is particularly effective in transferring thermal energy to a gas, e.g., air, as a result of the relatively large ratio of surface area to cross-sectional area afforded by filler 80 for efficient heat transfer by convection.

The diameter of enclosure 72 is sufficiently large so as to block a substantial amount of reflected light which may be scattered due to surface irregularities of the cones 54–60. the outer cylindrical surface of the enclosure upon which the reflected light impinges is formed with a relatively high absorbtivity $(\alpha)$ coefficient for efficiently absorbing the concentrated reflected light, and with a relatively low emissivity $(\epsilon)$ coefficient to minimize heat losses due to re-radiation Preferably the outer surface of enclosure 72 is formed by a combination of an underlying layer of bright nickel and a thin overlying layer of black nickel on the order of a few microns in thickness. This combination of black nickel over bright nickel provides an $\alpha$ coefficient of 0.96 and an $\alpha$ coefficient of 0.06 so that the $\alpha/\epsilon$ ratio is 16.5.

A transparent heat exchange fluid such as a gas, e.g., air, or a fluid, e.g., cold water, is moved by a suitable pump, not shown, into chamber 50 by means of an inlet conduit 82 which discharges upwardly through an opening formed in partition 48. Inlet chamber 50 thereby serves as a manifold which supplies the fluid into the open front ends of each cone 54–60. An outlet conduit 84 projects from outlet chamber 52 through a circuit to the desired end use application, such as a water storage tank or steam engine or motor where collector 37 is used as a steam generator.

In the operation of the embodiment of FIGS. 2–4, housing is mounted on the suitable foundation, such as the outer wall of a building, so that the focal axes of the cones are arrayed generally in the direction of the maximum sun angle. Incident rays from the sun pass through transparent panel and strike the inner surfaces of the cones. The rays are then reflected in convergence toward the focal axis where they impinge upon and are absorbed on the outer surface of structure. The absorbed energy is conducted as thermal energy through the walls of enclosure 72 and into the material of filler 80. A heat exchange fluid such as air is pumped through inlet conduit into inlet chamber 50. The air is directed through each of the enclosures within the cones where it is heated up through convection as it contacts the large surface area of filler 80. The heated air is then discharged into outlet chamber 52 from which it is directed to the end use application, such as the heating ducts of a building.

FIG. 5 illustrates another embodiment of the invention incorporating a modified form of an energy absorbing structure 86 for use with the collector of FIGS. 2 and 3. Energy absorbing structure 86 comprises an elongate hollow enclosure 88 formed of a suitable high thermal conductivity $(k)$ material such as silver, aluminum or copper. The enclosure has open front and rear ends and is mounted within the cones in a manner similar to that described for the collector of FIGS. 2–4. A porous filler 90 comprising a plurality of cells is mounted within enclosure 88, with the cells being open at their opposite ends for directing fluid through the enclosure. The cells are defined by sidewalls 92 which form a hexagonal cross-sectional configuration, with the cells extending along parallel axes longitudinally of the enclosure between their front and rear ends. The sidewalls of the cells are formed of a suitable high thermal conductivity $(k)$ material, such as copper or aluminum, and the cells are of a small diameter, on the order of one-eighth inch, to create a relatively large surface area to cross-sectional area ratio for efficient heat transfer by convection.

Energy absorbing structure 86 of the embodiment of FIG. 5 is specially adapted for use with a liquid heat exchange medium, such as cold water, because of the relatively low resistance to fluid flow. The structure could also be used with a gas as the heat exchange medium. The honeycomb-type cellular configuration provides a relatively high surface area in contact with the fluid, and because the rate of heat transfer by convection is proportional to surface area there is a resulting high rate of heat transfer from the cells to the fluid.

FIG. 6 illustrates an embodiment of the invention providing another energy absorbing structure 94 for use in the collector of FIGS. 2 and 3. This embodiment includes an elongate hollow enclosure 96 which contains a porous filler 98 comprising a plurality of cells of circular cross-sectional shape. Preferably the cells are formed by securing together, by means such as soldering, a plurality of elongate round tubes 100 formed of a suitable high thermal conductivity $(k)$ material, such as copper or aluminum. The diameter of the tubes are small, such as one-eighth inch, to provide a relatively large ratio of surface area to cross-sectional area. The tubes are open at their front and rear ends for directing the heat exchange medium, such as a liquid, e.g., cold water, in heat exchange relationship through the filler in a manner similar to that described for the embodiment of FIG. 5.

FIG. 7 illustrates an embodiment of the invention which provides a modified porous filler 102 for use within the enclosures of the energy absorbing structures described in the embodiments of FIGS. 5 and 6. In this embodiment filler 102 includes a plurality of elongate cells, shown as having a hexagonal cross-sectional shape, formed by sidewalls 104 of a high thermal conductivity ($k$) material, such as copper or aluminum. The cells are mounted within the enclosures in the manner previously described. Filler 102 additionally includes elongate skeins 106, 107 which are loosely packed within each cell. The skeins are comprised of a strand-like material having a high thermal conductivity, such as copper wool or steel wool. The filler 102 of this embodiment is specially adapted for use with a gaseous heat exchange fluid, e.g., air, in an energy absorbing structure arranged in the manner described in the embodiment of FIGS. 2–4. In such case the cells would be of a relatively larger diameter, e.g., three-sixteenth inch. Heat transfer to the gas is efficient as a result of the strand-like skeins, which provide a very high surface area for transferring thermal energy by convection to the gas, in combination with the sidewalls of the cells, which quickly conduct energy from the surrounding enclosure deeply into the flow area. Heat flow rate to the strand-like skeins is thus very rapid and this in turn increases the heat flow rate by convection to the gas or other heat exchange medium.

It is apparent from the foregoing that there has been provided a new and improved solar energy collector. The energy is collected and transferred as thermal energy to a heat exchange fluid with a high degree of efficiency. Incident rays from the sun are reflected by the cones in a manner to converge upon a small sized energy absorbing structure which is covered with a material having a relatively high $\alpha/\epsilon$ ratio. The cost of the collector is therefore relatively small because of the reduced requirement for the relatively expensive coating material. The invention makes it feasible to mount an array of the cones along spaces which would otherwise not be readily used for collecting solar energy, such as on the outside walls of a building. The collector is also adaptable to blend into the outside decor of a building. In addition the invention permits the cones to be mounted at any desired angle within a flat array for optimum absorption of the available solar energy at a particular location.

While the foregoing embodiments are at present considered to be preferred it is understood that numerous variations and modifications may be made therein by those skilled in the art and it is intended to cover in the appended claims all such variations and modifications as fall within the true spirit and scope of the invention.

I claim:

1. A device for collecting energy from a source of radiant energy, including the combination of means forming a conical ray reflecting surface which diverges outwardly from an apex toward a collecting end through which rays of the radiant energy are received, said reflecting surface being adapted to reflect said rays toward a focal axis which extends through the apex, an elongate energy absorbing structure mounted radially within the conical surface and extending along said focal axis, said structure comprising an elongate hollow enclosure having an open front end facing in the direction at which the reflecting surface diverges and an open rear end facing in the direction of the apex, said structure including an outer surface adapted to absorb the radiant energy of said reflected rays, a plurality of cells mounted within the enclosure, said cells having a hexagonal cross-sectional configuration whereby the plurality of cells forms a honeycomb-type structure with common sidewalls of adjacent cells forming a side of the hexagonal configuration, each of said cells being defined by radiant energy absorbing and thermal energy conducting sidewalls with the cells extending along parallel axes longitudinally of the enclosure between open front and rear ends through which fluid is directed, and means to direct a fluid in heat exchange relationship with the energy absorbing structure to absorb thermal energy by receiving thermal energy by convection from the enclosure.

2. A device for collecting energy from a source of radiant energy, including the combination of means forming a conical ray reflecting surface which diverges outwardly from an apex toward a collecting end through which rays of the radiant energy are received, said reflecting surface being adapted to reflect said rays toward a focal axis which extends through the apex, an elongate energy absorbing structure mounted radially within the conical surface and extending along said focal axis, said energy absorbing structure comprising an elongate hollow enclosure which forms an outer surface to intercept the reflected rays, said hollow enclosure having an open front end facing in the direction at which the reflecting surface diverges and an open rear end facing in the direction of the apex, a porous filler within the enclosure, said filler comprising metal wool having surfaces which are free of a radiant energy absorptive coating, with the filler being in thermal-energy absorbing contact with the enclosure and being permeable to the flow of fluid therethrough, said filler having a large surface area in relation to the cross-sectional area of the enclosure for conducting heat by convection from the material to the fluid, and means to direct a fluid through the enclosure in heat exchange relationship with the filler.

3. A radiant energy collecting device as in claim 2 in which a plurality of said concial surfaces are mounted together in an array which extends generally transversely of the direction of rays from the source whereby the array of plural surfaces are mounted across the wall or roof of a building for collecting radiant energy which is incident thereon.

* * * * *